United States Patent [19]

Bourgonje

[11] Patent Number: 4,560,835
[45] Date of Patent: Dec. 24, 1985

[54] POWER SUPPLY ARRANGEMENT FOR APPLYING DIRECT CURRENT TO SUBSCRIBER CIRCUITS

[75] Inventor: Wouter Bourgonje, Eindhoven, Netherlands

[73] Assignee: U.S. Philips Corporation, New York, N.Y.

[21] Appl. No.: 512,501

[22] Filed: Jul. 11, 1983

[30] Foreign Application Priority Data

Jul. 12, 1982 [NL] Netherlands ............................ 8202812

[51] Int. Cl.⁴ ........................ H02P 13/26; H04M 3/00
[52] U.S. Cl. .................................. 179/16 AA; 307/32; 307/41; 179/34
[58] Field of Search .................... 179/70, 77, 34, 35, 179/36, 40, 17 R, 18 J, 18 HB, 16 AA; 178/66.1; 307/41, 32; 323/267

[56] References Cited

U.S. PATENT DOCUMENTS 3,965,447  6/1976  Thomas ......................... 179/81 R X
4,163,906  8/1979  Shimamura ....................... 307/41 X Primary Examiner—James L. Dwyer
Attorney, Agent, or Firm—Thomas A. Briody; William J. Streeter; Leroy Eason

[57] ABSTRACT

A power supply for supplying pulsed direct current from a central power source to a plurality of subscriber circuits in a telephone system. The variation of the terminal voltage of the central power supply due to the pulsating load is reduced by shifting the phases of the current pulses supplied to the various subscriber circuits so they are produced in different time intervals relative to each other.

5 Claims, 3 Drawing Figures

POWER SUPPLY ARRANGEMENT FOR APPLYING DIRECT CURRENT TO SUBSCRIBER CIRCUITS

BACKGROUND OF THE INVENTION

1 Field of the Invention

The invention relates to a power supply arrangement for applying direct current to subscriber circuits in a telephone system, comprising:

a controllable pulse generating arrangement which for its supply is connectable to a central supply source, a control arrangement connected to the pulse generating arrangement for having the pulse generating arrangement supply current pulses under the control of control signals produced by the control arrangement and smoothing circuits provided in a one-to-one relationship with the subscriber circuits and connected to the pulse generating arrangement for converting the current pulses produced by the pulse generating arrangement into smoothed direct current.

2. Description of the Related Art

Such a power supply arrangement is disclosed in U.S. Pat. No. 3,965,447.

The power supply arrangement described in this United States Patent comprises a pulse arrangement in the form of a pulse source which applies current pulses to a plurality of smoothing circuits which each apply direct current to a subscriber line. As all the smoothing circuits are connected in parallel with each other to the pulse source significant current changes are produced in the d.c. voltage source from which the pulse source is supplied.

In a telephone system in which a plurality of smoothing circuits is provided with current pulses by one central pulse generating arrangement, the significant current changes in the central supply source produce a voltage ripple across the internal resistance of this supply source. This voltage ripple has a disturbing effect on the telephone system.

SUMMARY OF THE INVENTION

The invention has for its object to limit this unwanted voltage ripple across the central supply source. For that purpose, according to the invention, a power supply arrangement of the type defined in the opening paragraph is characterized in that the pulse generating arrangement comprises N controllable pulse sources (N=2, 3, 4, ...) each connected to an individual subscriber's circuit, that the control arrangement is connected to each of the controllable pulse sources for applying such individual control signals to the pulse sources that the current pulses produced by each of these pulse sources form current pulse signals having mutually equal pulse frequencies and that the control arrangement comprises a phase control arrangement for causing mutual phase differences to be present between the current pulse signals by means of the control signals.

An advantageous effect of these measures is that the uniformity of the load on the central supply source is improved.

In order to optimize the uniformity of the load on the central supply source, the supply arrangement in accordance with the invention may be characterized in that the phase control arrangement produces a mutual phase difference of $2\pi/N$ radians between every two consecutive phase-shifted current pulse signals.

The power supply arrangement according to the invention may be characterized in accordance with a further measure in that the control signals which are individually applied to the pulse sources are pulse signals having the same mutual phase and frequency relationship as the current pulse signals. With this correlation between the control signals and the current pulse signals with the pulse sources may be of a simple construction. Particularly when the current pulse signals and the control pulse signals have the same pulse durations, the pulse sources may each be constituted by a respective single switching element (for example the main current path of a transistor) included in the current path from the central power supply to the corresponding smoothing circuit.

BRIEF DESCRIPTION OF THE DRAWINGS

The invention and its advantages will now be further described by way of example with reference to the accompanying drawings, in which.

DESCRIPTION OF THE PREFERRED EMBODIMENTS

Figure 1:
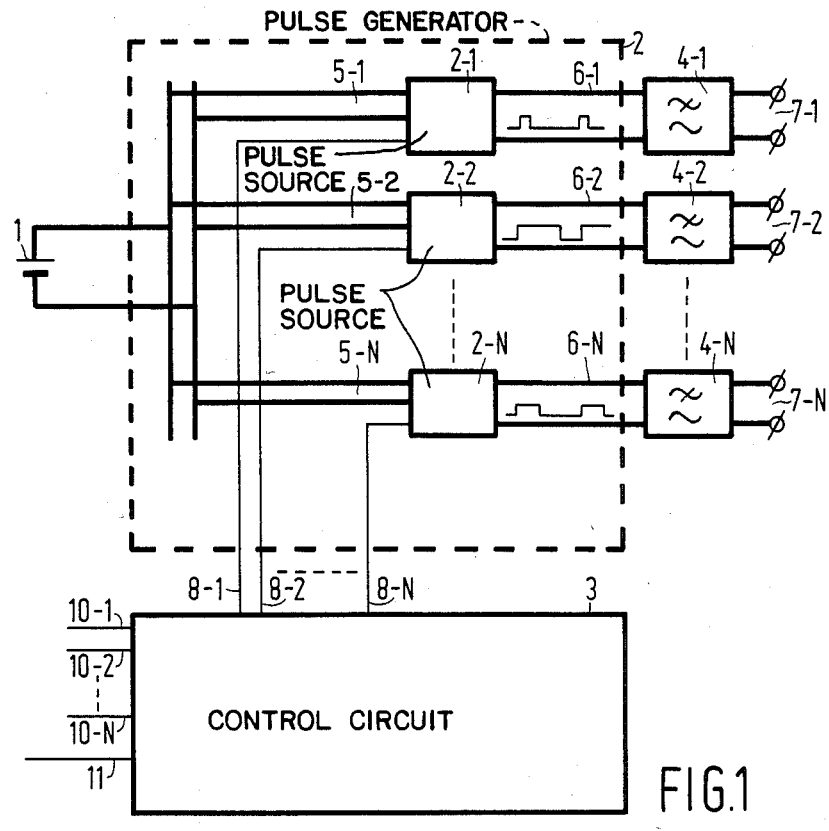
FIG. 1 is a block diagram of a supply arrangement in accordance with the invention.

The supply arrangement shown in FIG. 1 is formed by a central supply source 1, a controllable pulse generating arrangement 2, a control arrangement 3 and a number of smoothing circuits 4-1 to 4-N.

The controllable pulse generating arrangement 2 comprises a number N of controllable pulse sources 2-1 to 2-N, each being connected for their supply to the central supply source 1 via their respective supply lines 5-1 to 5-N.

Any value exceeding one may be chosen for the number N, a frequently used value for N being 16, as 16 subscriber's circuits can be accommodated on one printed circuit board in the exchange.

In addition, each of the pulse sources 2-1 to 2-N is connected via a respective one of the individual current pulse output lines 6-1 to 6-N, to a respective one of the smoothing circuits 4-1 to 4-N, current pulse signals being applied with mutually equal frequencies to the smoothing circuits 4-1 to 4-N, via these current pulse output lines. For its control, each pulse source is also connected to the control arrangement 3 via a respective one of the individual control lines 8-1 to 8-N. The pulse sources 2-1 to 2-N, may be of a construction which is known per se; each may be in the form of, for example, one single transistor as will be described hereinafter.

Each smoothing circuit 4-1 to 4-N is connectable to a subscriber's circuit, not shown, via a respective one of the direct current outputs 7-1 to 7-N. Numerous constructions for these smoothing circuits are known; they may, for example, each be in the form of low-pass filter consisting of a coil and capacitors. Such a smoothing circuit is described in the said U.S. Pat. No. 3,965,447.

Via the control lines 8-1 to 8-N the control arrangement 3 applies a control signal to each of the individual pulse sources 2-1 to 2-N. This control signal determines a number of parameters of the said current pulse signals, such as, for example, the mutual phase difference between the current pulse signals and the pulse duration of the current pulses. The control arrangement 3 may also have N connecting lines 10-1 to 10-N whereby information about the pulse duration of the current pulses is applied to the control arrangement 3. In addition, the control arrangement 3 is connected to a central clock via the clock connection line 11.

Under the control of the control arrangement 3 each pulse source 2-1 to 2-N applies current pulses to the smoothing circuit corresponding to the relevant pulse source. These current pulses are derived from the central supply source 1. In order to ensure that the load presented is as uniform as possible with time, the pulse sources 2-1 to 2-N are controlled by the control arrangement 3 in such manner that there is applied a mutual phase shift between the phases of the current pulse signals, so that the starting instants of the current pulses of the current pulse signals do not coincide. This results in the current produced by the central supply source evidencing only a ripple which is much smaller than the ripple of the sum of the currents would be if all the current pulses were to have the same phase. The amplitude of the annoying voltage ripple which is produced across the internal resistance of the central source in response to this current ripple is reduced because of the phase shift.

The phase shift of the current pulse signals can be effected either group-wise or individually, uniformly distributed or not uniformly distributed over the period of the current pulse signals. An optimum uniformity of the load is obtained by means of individual phase shifts which are uniformly distributed over the period, which situation can be easily realized by means of a phase control arrangement still to be described.

Figure 2:
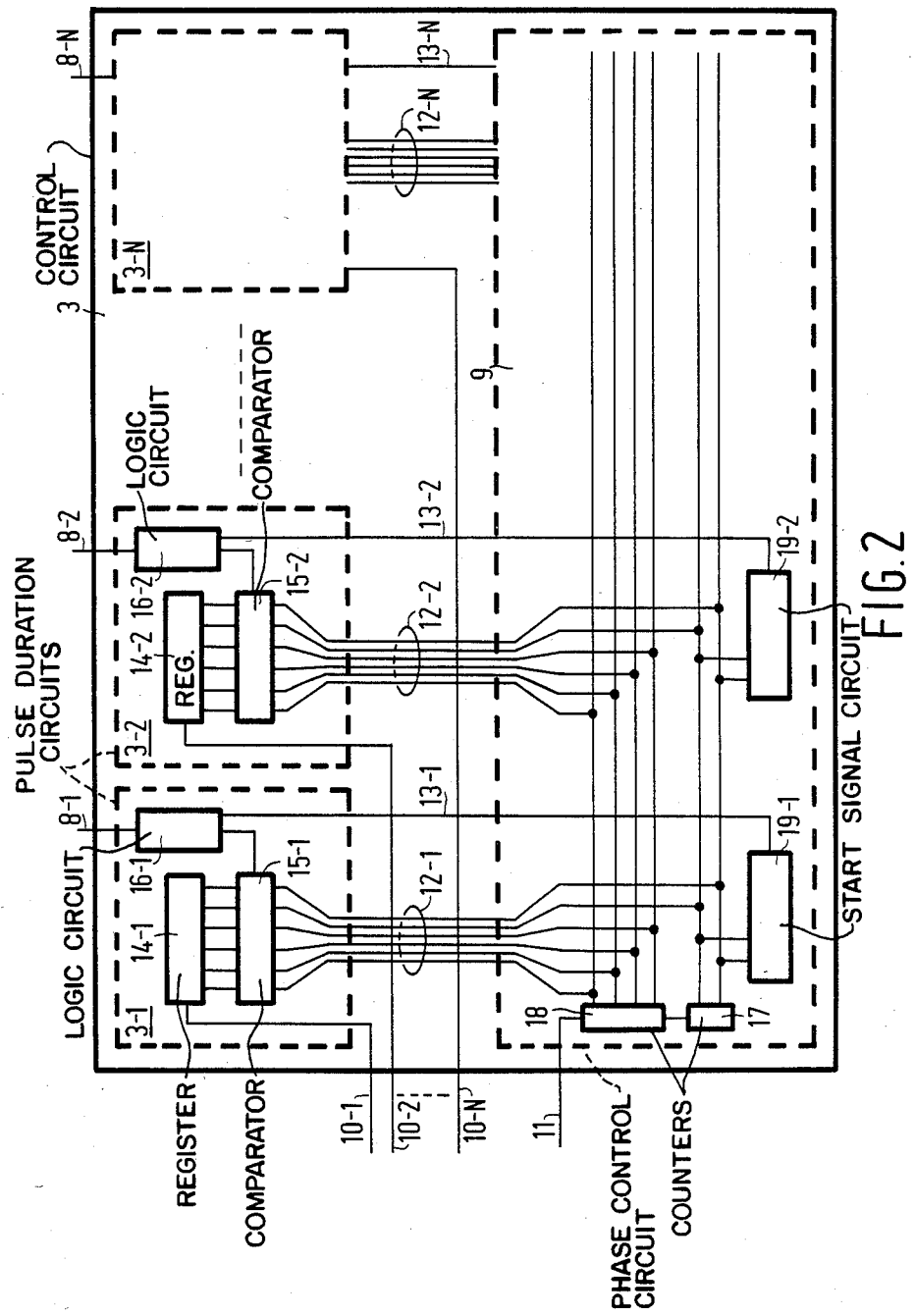
FIG. 2 is a block diagram of a control arrangement included in the arrangement of FIG. 1.

The control arrangement 3 shown in FIG. 2 comprises N pulse duration-determining circuits 3-1 to 3-N. These pulse duration-determining circuits produce control signals which determine the starting moments and the duration of the relevant current pulses. Many shapes of control signals are possible, depending on the constructions of the pulse sources 2-1 to 2-N and the construction of the control arrangement 3. The control signals which are preferably used in the supply arrangement according to the invention are in the form of pulse signals having a variable pulse duration. The starting moments and the pulse duration of the relevant current pulses are then determined by the starting moments and the pulse duration, respectively, of the control pulse signals. These control pulse signals make it possible for the pulse sources 2-1 to 2-N to be of a very simple construction, for example in the form of a transistor whose main current path is connected between an input and an output of the pulse source and whose base is driven by the control pulse signal.

Each pulse duration-determining circuit 3-1 to 3-N has its output connected to a respective one of the control lines 8-1 to 8-N. Each of the pulse duration-determining circuits is also connected via a respective one of the connecting lines 10-1 to 10-N to an arrangement, not shown, for providing information about the pulse duration of the current pulses. This arrangement may, for example, be a central processing unit of the telephone exchange of which the supply arrangement forms part.

In addition, the control arrangement 3 comprises a phase control arrangement 9. Each pulse duration-determining circuit is connected to the phase control arrangement 9 via a respective one of the timing signal lines 12-1 to 12-N and via a respective one of the start signal lines 13-1 to 13-N. The phase control arrangement 9 is connected to a central clock, not shown, via a clock connection line 11.

The phase control arrangement 9 comprises a first cyclic counter 17, which is subsequent to a second cyclic counter 18, and starting signal circuits 19-1 to 19-N which are connected to respective ones of the pulse duration-determining circuits 3-1 to 3-N. The input of the second counter 18 receives a clock signal via the clock connection line 11. Th input of the first counter 17 is controlled by the last stage of counter 18. Thus, the counter 17 and 18 together form one cyclic counter 17, 18. The content of this cyclic counter which, because of the control from the central clock is a measure of the progress of time, is transferred to each of the pulse duration-determining cicuits 3-1 to 3-N via the corresponding one of the timing signal lines 12-1 to 12-N.

The counting state of the first counter 17 is applied to each of the starting signal circuits 19-1 to 19-N. Each of these circuits produces a starting pulse when the counting state applied to the relevant circuit is equal to a value preset in that circuit.

Each starting signal circuit is, for example, constituted by an AND-gate having several inverting or non-inverting inputs. Setting the value at which a starting pulse is required to be produced is then effected by constructing the relevant inputs as inverting or non-inverting inputs. These circuits are generally known. The pulse duration-determining circuits 3-1 to 3-N are mutually identical; these circuits will be described on the basis of the pulse duration-determining circuit 3-1. This pulse duration-determining circuit is formed by a pulse duration register 14-1, a comparator circuit 15-1 and a logic circuit 16-1.

A number which represents the moment at which the control pulses end is written into and stored in the pulse duration register 14-1. This moment is located within each period of the control pulse signal and is fully determined by the value of the said number. This number is written into the pulse duration register 14-1 from the central processing unit and, optionally, an intermediate storage register via connecting line 10-1. Connection line 10-1 is a symbolic representation of a line which may include several conductors, more specifically as many conductors as there are stages in the pulse duration register.

The comparison circuit 15-1 is connected to all the stages of the pulse duration register 14-1 and also to the timing signal line 12-1. The number of stages of the comparison circuit 15-1, the number of stages of the pulse duration register 14-1 and the number of conductors of the timing signal line 12-1 correspond to the number of stages of the counter 17, 18. Numbers which form a representation of the progressing time are applied to the comparison circuit 15-1 via the timing signal line 12-1. If the number applied by timing signal line 12-1 and the number in the pulse duration register 14-1 are equal, comparison circuit 15-1 applies a stop signal to the logic circuit 16-1.

The logic circuit 16-1 has a first input connected to the output of comparison circuit 15-1 and a further input connected to the phase control circuit 9 via a start signal line 13-1.

The logic circuit 16-1 may be in the form of a bistable circuit whose output assumes a given logic value in response to a pulse at the first input and whose output assumes the complementary logic value in response to a pulse at the second input. These circuits are generally known. The logic circuit 16-1 applies control pulse signals to pulse source 2-1 via control connection 8-1. Each of the control pulses forming this control pulse signal is started by applying a start signal from start pulse circuit 19-1 to logic circuit 16-1 via start signal line 13-1. The period of the control pulse signal and consequently also the period of the associated current pulse signal is therefore equal to the period of the start pulse signal and consequently also equal to the cycle time of the cyclic counter 17, 18.

Each of the control pulses is ended by applying a stop signal, received from the output of comparison circuit 15-1, to logic circuit 16-1.

The start signal and the number applied to comparison circuit 15-1 via timing signal line 12-1 are both received from the phase control arrangement 9. In the event that the counter 17 of the phase control arrangement 9 is a four-stage 2-bit counter, 16 different counting states are possible. When 16 start signal circuits 19-1 to 19-16 are used, a value which always corresponds to a different one of the counting states can be set in each of the start signal circuits, as a result of which a uniform distribution of the start signals over a complete cycle of the counter is realised. As a result thereof the phase difference between two consecutive control pulse signals becomes equal to $2\pi/16$ radians.

It should be noted that if the phases of the current pulse signals are shifted group-wise, it is not necessary to provide the start signal circuits in a one-to-one relationship with the pulse sources. When, for example, 16 pulse sources are used, divided into four groups of four pulse sources with a phase difference of $\frac{1}{2}\pi$ radians between two consecutive groups, it is sufficient to use only four start signal circuits. Each start signal circuit then produces the starting pulses for the four pulse duration-determining circuits of a respective individual group. In that case it is sufficient to provide two stages in counter 17.

Figure 3:
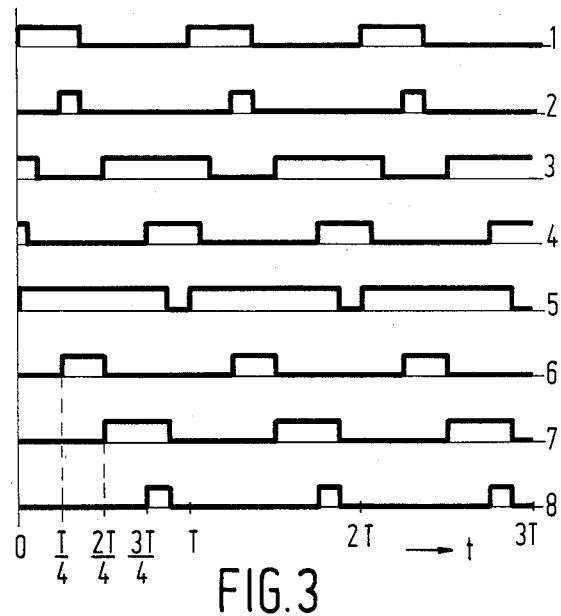
FIG. 3 is a graphic representation of the variation of some pulse-shaped control signals versus time.

FIG. 3 shows the variation versus time of a portion of the control pulse signals such as they are produced in the above-described case in which four groups of four pulse duration-determining circuits are used.

The figure shows two control pulse signals from each group of pulse duration-determining circuits connected to one start signal circuit. The control pulse signals 1 and 5 belong to one group, which is evidenced by the identical starting instants of the control pulses; the same holds for the pairs of control pulse signals 2 and 6, 3 and 7 and 4 and 8. The Figure clearly shows that the phases of the control pulse signal which belong to one group differ by $\frac{1}{4}\pi$ radians from those of the group of immediately subsequent current pulse signals. As the pulse duration is a measure of the voltage to be applied to the relevant subscriber's circuit, it is only determined by the individual subscriber's circuits.

So there is no necessary correlation between the pulse duration of different control pulse signals.

What is claimed is:

1. A power supply arrangement for supplying direct current to a plurality N (N=2, 3, 4 . . . ) of subscriber circuits in a telephone system, comprising:

a controllable pulse generating arrangement comprising N controllable pulse sources for connecting the respective subscriber circuits to a central source of direct current;

a control arrangement connected to each of said pulse sources for applying control signals thereto which cause them to supply pulses of current from said central source to the respective subscriber circuits, the duration of the current pulses produced by each of said pulse sources being controlled by the control signals applied thereto;

and a plurality of smoothing circuits connected between the respective subscriber circuits and said pulse sources for converting the current pulses produced thereby into smoothed direct current;

said control arrangement comprising a phase control circuit for producing relative phase differences between the start of each the control signals applied to respective ones of said pulse sources, whereby relative phase differences are produced between the start of each current pulse produced by said pulse sources.

2. A power supply arrangement as claimed in claim 1, characterized in that the phase control circuit produces a phase difference of $2\pi/N$ radians between the start of each current pulse produced by successive pulse sources in response to successive control signals.

3. A power supply arrangement as claimed in claim 1, characterized in that the control signals applied to said pulse sources have the same relative phase and frequency relationships as the current pulses produced in response thereto.

4. A power supply arrangement as claimed in claim 3, characterized in that the phase control arrangement comprises a first cyclic counter which is controlled by a central clock, and start signal circuits connected to this counter for producing control pulse starting signals under the control of the counting states occurring in the counter.

5. A power supply arrangement as claimed in claim 4, characterized in that control arrangement further comprises:

a second cyclic counter arranged in cascade with the first cyclic counter between it and the central clock, pulse duration registers provided in a one-to-one relationship with the pulse sources, comparison circuits provided in a one-to-one relationship with the pulse sources for comparing the content of the associated pulse duration register with the content of the cyclic counters, and logic circuits provided in a one-to-one relationship with the comparison circuits for supplying the individual control pulse signals, an input of the respective logic circuits being connected to respective ones of the start signal circuits and a further input of the respective logic circuits being connected to the associated comparison circuit.

* * * * *